3,787,351
USE OF SOLUBLE FLUOROALIPHATIC OLIGOMERS IN RESIN COMPOSITE ARTICLES
Maynard H. Olson, St. Paul, Minn., assignor to Minnesota Mining & Manufacturing Company, St. Paul, Minn.
No Drawing. Filed Feb. 28, 1972, Ser. No. 230,063
Int. Cl. C08g *51/10;* C08f *45/10*
U.S. Cl. 260—40 R          18 Claims

ABSTRACT OF THE DISCLOSURE

Mechanical properties of shaped articles of self-supporting structural filled or reinforced resin composites, such as glass fiber reinforced polyesters or epoxy resin composites, are improved by incorporating in the composite soluble fluoroaliphatic radical-containing oligomers.

---

This invention relates to shaped articles of self-supporting filled or reinforced resin composites. In another aspect it relates to reinforced plastic composites, such as glass fiber reinforced polyesters or epoxy composites. In a still further aspect, it relates to methods of making said composites.

Every-increasing attention is being directed to the development and manufacture of shaped articles of filled or reinforced resin composites (synthetic assemblies of selected fillers or reinforcing elements in compatible resin binders or matrices). Because of great strength, light weight, thermal stability, and other desirable properties, composite materials are finding wide application in aerospace, marine, military, commercial and industrial fields as structural materials, ranging from space vehicles, rocket motors, and high-pressure cylinders to fishing rods and golf clubs.

One of the most common and widely used composites is the glass-filled plastic composite. In such composite, glass in different forms (such as fibers, spheres, flakes and particulates) is used as reinforcement primarily for thermosetting resins (such as polyester, phenolics, and epoxy resins) and to a small extent for thermoplastic resins (such as polyethylene, polycarbonates and polyvinylchloride).

The presence of voids in the resin matrix phase of a filled composite, such as glass fiber reinforced epoxy composites, has a pronounced effect on mechanical properties, such as strength, of the composite. Void-containing composites tend to fail by debonding between the fibers and resin matrix. The voids are believed to decrease the total bonded area and in addition act as points of stress concentration, and hence decrease the strength of the composite, presumably by the breaking of individual highly stressed fibers or strands and the transfer of stress to succeeding strands causing progressive breakage of strands. Consequently, precautions are taken during the processing of composites to minimize the presence of voids and insure wetting of the fibers with resin so as to promote strong bonding between the fibers and resin. Such precautions involve, for example, extensive working of impregnated mats, imposing a vacuum to remove entrapped bubbles, and molding under pressure. Though such processing techniques are generally useful in minimizing the presence of voids, for many applications of composite materials such techniques are not as satisfactory as desired because even with such techniques the resulting composites still contain significantly higher than the ideal concentration of zero voids.

High void content also promotes water absorption and in applications involving marine environments and hydrostatic pressure such absorption adversely affects the mechanical strength of the composite. Water may be absorbed by the resin and act as a plasticizer, reducing bond strength and stiffness of the composite. Water may also migrate to the site of the fiber-resin interface by diffusion through the resin, penetrating through cracks, voids and other defects or by migration along the fiber surfaces. The fiber-resin bond may be weakened by the water with consequent adverse affects on the mechanical properties of the composite.

Briefly, according to this invention, mechanical properties of shaped articles of filled or reinforced synthetic resin composites, such as glass reinforced polyester or epoxy resin composites, are improved by incorporating in the composite fluoroaliphatic radical-containing oligomers which are soluble in the resin matrix. Such oligomers act in effect as wetting agents in that they promote the wetting of the fillers or reinforcing elements by the resin so as to promote a strong and extensive bond therebetween and minimize the presence of voids, thereby improving mechanical properties of the resulting composite.

The oligomers can be applied to the filler or reinforcement surface, particularly a fresh clean surface, either neat or in solution, followed by evaporation of solvent. Alternatively, the oligomer can be added to the resin component before, it is admixed with the filler or reinforcement. The composite mixture is then shaped as desired, for example as a laminate, and otherwise processed by known techniques to form self-supporting structural shaped articles.

The fluoroaliphatic radical-containing oligomers used in this invention to improve mechanical properties of filled composites having plurality of pendant fluoroaliphatic groups linked to moieties which impart or increase solubility of the fluoroaliphatic groups in the resin matrix. Generally, the most effective solubilizing moiety will be similar in nature to that of the resin matrix. For example, where polar resin matrices, e.g. polyesters, are used, the solubilizing moiety should also be polar in nature, e.g. such as a moiety containing a plurality of oxygen atoms. For non-polar resin matrices, e.g. vinyl polymers, the solubilizing moiety can be predominantly hydrocarbon in nature.

Particular fluoroaliphatic oligomers useful in this invention are those in which the plurality of fluoroaliphatic radicals are linked to solubilizing poly(oxyalkylene) moieties. Such moieties are particularly useful because they are generally soluble over a wide range of polarity, and by alteration of the carbon-oxygen ratio they can be tailored for any particular matrix. These fluoroaliphatic oligomers are generally non-ionic, normally liquid or low melting solids. They are soluble in polar synthetic resinous compositions. They have about 5 to 30 weight percent, preferably 10 to 25 weight percent carbon-bonded fluorine, based on the weight of the oligomer, the fluorine content residing in said plurality of pendant fluoroaliphatic radicals. These materials are relatively low molecular weight linear polymers, branched polymers, or lightly crosslinked polymers, containing from 3 or 4 up to about 25 or 30 monomer units, and thus are oligomeric, as contrasted to "high polymers" having molecular weight of 100,000 or higher.

A preferred class of fluoroaliphatic oligomers of this invention can be depicted by the general formulas:

  (I)

and

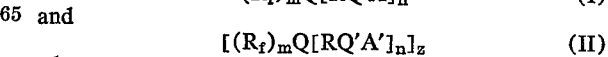  (II)

where $R_f$ is a fluoroaliphatic radical,
R is a solubilizing divalent organic radical free of functional groups containing active hydrogen atoms, such as poly(oxyalkylene) or alkylene, Q is a linkage through which $R_f$ and R radicals are covalently bonded together,
A is a monovalent terminal organic radical;
A' is A or a valence bond, with the proviso that at least one A' is a valence bond interconnecting a Q-bonded R radical to another Q,
Q' is a linkage through which A, or A', and R are covalently bonded together,
m is an integer of at least 2 and can be as high as 25 or higher,
n is an integer of at least 2, and can be as high as 60 or higher, and
z is an integer of 2 or higher, and can be as high as 30 or higher.

Fluoroaliphatic oligomers containing poly(oxyalkylene) solubilizing moieties can be expressed in terms of the formulas:

$$(R_f)_mQ[(OR')_xQ'A]_n \quad (III)$$

and $$[(R_f)_mQ[OR')_xQ'A']_n]_z \quad (IV)$$

where $R_f$, Q, Q', A, A', m, n, and z are as defined above for Formulas I and II, and where $(OR')_x$ is a poly(oxyalkylene) and x is an integer of at least 5, generally 10 to 75 and can be as high as 100 or higher.

In the above formulas, I to IV, the fluoroaliphatic radicals, $R_f$, are saturated, and generally monovalent aliphatic moieties. They can be straight chain, branched chain, and, if sufficiently large, cyclic, or combinations thereof, such as alkylcycloaliphatic radicals. The fluoroaliphatic skeletal chain can include caternary oxygen and/or trivalent nitrogen hetero atoms bonded only to carbon atoms, such hetero atoms providing stable linkages between fluorocarbon groups and not interfering with the inert character of the $R_f$ radical. While $R_f$ can have a large number of carbon atoms, $R_f$ radicals having not more than 20 carbon atoms will be adequate and preferred since larger radicals usually represent a less efficient utilization of fluorine than is possible with smaller $R_f$ radicals. Generally, $R_f$ will have 3 to 20 carbon atoms, preferably 6 to about 12, and will contain 40–78 weight percent, preferably 50–77 weight percent, carbon-bonded fluorine. The terminal portion of the $R_f$ radical has preferably at least three fully fluorinated carbon atoms, e.g. $CF_3CF_2CF_2$—, and the preferred $R_f$ radical is substantially completely, or fully fluorinated, as in the case where $R_f$ is perfluoroalkyl, $C_nF_{2n+1}$.

Generally, the oligomers will contain about 5 to 30 weight percent, preferably about 10 to 25 weight percent, of carbon-bonded fluorine. If the fluorine content is less than about 10 weight percent, impractically large amounts of the oligomer will generally be required where the oligomer is used as an additive for composites, while fluorine contents greater than about 35 weight percent result in oligomers which have too low a solubility to be efficient.

Where the solubilizing moiety in the oligomer is a poly(oxyalkylene) radical, $(OR')_x$, R' is an alkylene group having 2 to 4 carbon atoms, such as

—$CH_2CH_2$—, —$CH_2CH_2CH_2$—,

—$CH(CH_3)CH_2$—, and —$CH(CH_3)CH(CH_3)$—, the oxyalkylene units in said poly(oxyalkylene) being the same, as in poly(oxypropylene), or present as a mixture, as in a heteric straight or branched chain of randomly distributed oxyethylene and oxypropylene units or as in a straight or branched chain of blocks of oxyethylene units and blocks of oxypropylene units. The poly(oxyalkylene) chain can be interrupted by or include one or more catenary linkages, though it is preferred that such linkages be free of reactive functional groups containing active hydrogen atoms such as

—C(O)NH—$C_6H_4$—NHC(O)—, —S—,

—$CH_2$—CH—$CH_2$—, 

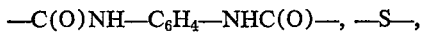

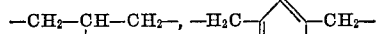

and —C(O)C(O)—, providing such linkages do not substantially alter the solubility-imparting character of the poly(oxyalkylene) chain. [The term "active hydrogen atom" as used in this application means a hydrogen atom (other than an amido hydrogen atom) which is reactive with a Grignard reagent, as described in J. Am. Chem. Soc., 49, 3181 (1927).] Where said catenary linkages have three or more valences, they provide a means for obtaining a branched chain of oxyalkylene units. The poly(oxyalkylene) radicals in the oligomers can be the same or different, and they can be pendant, as in the case of the Example 2. It is also preferred that where such oligomers are incorporated in composites, the molecular weight of the poly(oxyalkylene) radical be between about 500 and 2500, in order to obtain said desired solubility.

The function of the linkages Q and Q' is to covalently bond the fluoroaliphatic radicals, $R_f$, the solubilizing moieties (e.g. poly(oxyalkylene) moieties, $(OR_2)_x$), and radicals A and A' together in the oligomer. Q and Q' can be a valence bond, for example, where a carbon atom of a fluoroaliphatic radical is bonded or linked directly to a poly(oxyalkylene) moiety. Q and Q' each can also comprise one or more linking groups such as polyvalent aliphatic, e.g. $CH_2'CH$—, —$CH_2CH_2$—, and

—$CH_2CH(CH_2$—$)_2$ polyvalent aromatic, e.g.

 and —$CH_2$—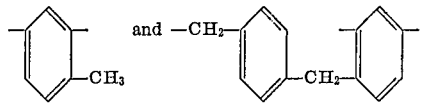

oxy, thio, carbonyl, sulfone, sulfoxy, phosphoxy,

—P(O)OH— amine, e.g. —NH— and —$N(C_2H_5)$—, and combinations thereof, such as oxyalkylene, iminoalkylene, iminoarylene, sulfonamido, carbonamido, sulfonamidoalkylene, carbonamidoalkylene, urethane, e.g.,

—$CH_2CH_2OCONH$— and

—$CH_2CH_2$—OCONH—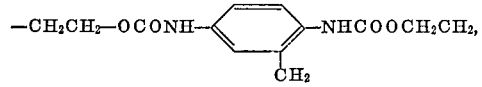—NHCOOCH$_2$CH$_2$, urea e.g. —NHCONH—, acylalkylene, e.g.,

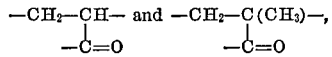

and ester, e.g.,

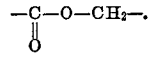

The linkages Q and Q' for a specific oligomer will be dictated by the ease of preparation of such an oligomer and the availability of necessary precursors thereof.

From the above description of Q and Q', it is apparent that these linkages can have a wide variety of structures, and in fact where either is a valence bond, it doesn't even exist as a structure. However large Q or Q' is, the fluorine content (the locus of which is $R_f$) is in the aforementioned limits set forth in the above description, and in general the total Q and Q' content of the oligomer is preferably less than 10 weight percent of the oligomer. Q and Q' are non-reactive with the resin matrix of the composite in which the oligomers are incorporated, and are preferably free of active hydrogen atoms (the active hydrogen constitutes less than 0.02 weight percent of the linkage) or other reactive functional groups.

The monovalent terminal organic radical, A, is one which is covalently bonded through Q' to the solubilizing moiety, e.g. poly(oxyalkylene) radical.

Though the nature of A can vary, it preferably is such that it compliments the solubilizing moiety in maintaining or establishing the desired solubility of the oligomer in the resin matrix. The radical A can be acyl, such as $C_6H_5C(O)-$, alkyl, preferably lower alkyl, such as methyl, hydroxyethyl, hydroxypropyl, mercaptoethyl and aminoethyl, or aryl, such as phenyl, chlorophenyl, methoxyphenyl, nonylphenyl, hydroxyphenyl, and aminophenyl. Generally, Q'A will be less than 50 weight percent of the [RQ'A] moiety.

The fluoroaliphatic radical-containing oligomers used in this invention can be prepared by a variety of known methods, such as by condensation, free radical, or ionic homopolymerization or copolymerization using solution, suspension, or bulk polymerization techniques (e.g., see "Preparative Methods of Polymer Chemistry," Sorenson and Campbell, 2nd ed., Interscience Publishers, (1968). Classes of representative oligomers useful in this invention include polyesters, polyurethanes, polyepoxides, polyamides, and vinyl polymers such as polyacrylates and substitute polystyrenes. The fluoroaliphatic moiety and the poly(oxyalkylene) moieties can be parts of separate comonomers or both can be present in a single monomer which is homopolymerized. Mixtures of fluoroaliphatic radical-containing monomers or mixtures of poly(oxyalkylene)-containing monomers can be used to prepare the oligomers used in this invention.

The polyacrylates are a particularly useful class of oligomers and they can be prepared, for example, by free radical initated copolymerization of a fluoroaliphatic radical-containing acrylate with a poly(oxyalkylene) acrylate, e.g. monoacrylate or diacrylate or mixtures thereof. The molecular weight of the polyacrylate oligomer can be controlled by adjusting the concentration and activity of the initiator, concentration of monomers, and temperature, and by chain-transfer agents, such as thiols, e.g. n-octyl mercaptan. As an example, a fluoroaliphatic acrylate, $R_f-R''-O_2C-CH=CH_2$ (where R'' is, for example, sulfonamidoalkylene, carbonamidoalkylene, or alkylene), e.g., $C_8F_{17}SO_2N(C_4H_9)CH_2CH_2O_2CCH=CH_2$, can be copolymerized with a poly(oxyalkylene) monoacrylate, $CH_2=CHC(O)(OR')_xOCH_3$, to produce a polyacrylate oligomer having the following repeating units:

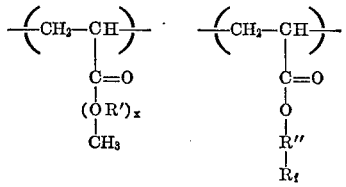

The polyacrylate oligomer depicted above falls within the scope of said Formulas I and III where

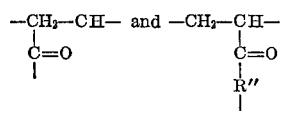

are included in Q. Fluoroaliphatic acrylates, such as described in the above preparation, are known in the art (e.g., see U.S. Pat. Nos. 2,803,615, 2,642,416, 2,826,564, 3,102,103, 3,282,905, and 3,304,278). The poly(oxyalkylene) acrylates used in the above preparation, and other acrylates useful for such purposes, can be prepared from commercially available hydroxy poly(oxyalkylene) materials, such as those sold under the trademarks "Pluronic," "Carbowax," "NIAX," and "Triton," by reacting such hydroxy materials in a known manner with acrylic acid, methacrylic acid, acrylyl chloride, or acrylic anhydride. Alternatively, a poly(oxyalkylene) diacrylate,

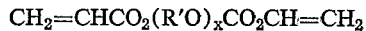

e.g.

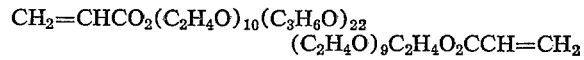

prepared in a known method similar to the monoacrylates, can be copolymerized with said fluoroaliphatic acrylate to obtain a polyacrylate oligomer falling within the scope of said Formulas II and IV, having the following repeating units:

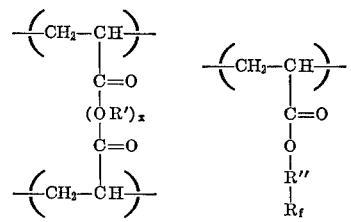

Other fluoroaliphatic radical-containing terminally ethylenically unsaturated monomers suitable for the preparation of the oligomers of this invention, for example by copolymerizing with corresponding poly(oxyalkylene)-containing, terminally ethylenically unsaturated comonomers, are known in the art (e.g., see U.S. Pat. Nos., 2,592,069, 2,995,542, 3,078,245, 3,081,274, 3,291,843, and 3,325,163, and the ethylenically unsaturated materials sutiable for providing fluoroaliphatic radical-containing structural units disclosed in U.S. Pat. 3,574,791).

Useful polyester oligomers used in this invention can be prepared by condensing a mixture of a fluoroaliphatic diol, such as $R_fSO_2N(CH_2CH_2OH)_2$, poly(oxyalkylene) polyol such as $H(OR')_xOH$, and poly(oxyalkylene) alcohol $H(OR')_xA$, with a stoichiometric quantity of a diacyl halide, e.g. $R'''(COCl)_2$ (where R''' is a divalent aromatic or aliphatic radical). The resulting oligomer has the repeating units:

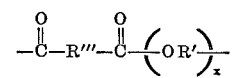

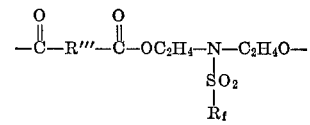

The above depicted polyester oligomer falls within the scope of said Formulas I and III, where

and $-C(O)R'''C(O)OC_2H_4-N(SO_2R_f)C_2H_4O-$ are included in Q, the terminal A groups of this oligomer being derived from said poly(oxyalkylene) alcohol, $H(R'O)_xA$. Said fluoroaliphatic diols, and others which are equivalent for this purpose, are known in the art (e.g., see U.S. Pat. Nos. 3,217,035, 2,915,554, 3,478,116, 3,470,258, and 3,472,894). Alternatively, in lieu of or in admixture with the diacyl halide described above, other diacid derivatives can be used such as diethylphosphite sulfuryl chloride, phosgene, and maleic anhydride. As a further alternative, in addition to said diacid or diacid derivatives, small amounts of poly(oxyalkylene) triols or triacids and their derivatives can be used to prepare polyester oligomers falling within the scope of said Formulas II and IV.

Polyester oligomers used in this invention can be prepared by reacting fluoroaliphatic radical-containing polybasic acids with poly(oxyalkylene) polyols. Useful polybasic acids for this purpose are also known in the art (see U.S. Pat. Nos. 3,346,612, 3,471,518, 3,463,482, and 3,478,116).

Another class of fluoroaliphatic radical-containing oligomers useful in this invention is condensation polymers prepared by the reaction of precursor fluoroaliphatic radical-containing compounds having one or more active hydrogen atoms with an excess of an aliphatic or aromatic polyisocyanate, to form isocyanate-terminated adducts or intermediates which are then reacted with poly(oxyalkylene) polyols, such as the above-described diols (the preferred polyols) and the corresponding triols and tetrols. If the NCO/OH mol ratio of the reaction mixture is in excess of the stoichiometric, an isocyanate-terminated oligomer results, and the isocyanate terminal groups are then reacted with a mono-functional active hydrogen-containing compound, e.g. methanol, to produce a non-reactive oligomer of this invention. On the other hand, if the NCO/OH mol ratio is less than the stoichiometric ratio, a hydroxy-terminated oligomer results.

As an example, where the fluoroaliphatic radical-containing precursor is $R_fSO_2N(CH_2CH_2OH)_2$, and it is reacted with an excess of phenylene diisocyanate, the resulting isocyanate-terminated adduct is reacted with poly(oxyalkylene) glycol to produce an oligomer which is then capped with a non-functional terminal group, a polyurethane oligomer having the following repeating units is produced:

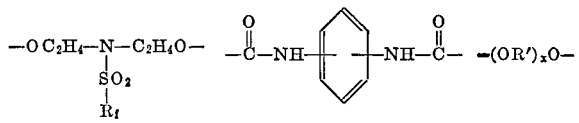

The above depicted polyurethane oligomer falls within the scope of said Formulas I and III, where all of the depicted structure except $R_f$ and $(OR')_x$ is included in Q. Inclusion of a small amount of triol or tetrol, or a triisocyanate or tetraisocyanate, in the above-described formulation will result in a polyurethane oligomer falling within the scope of said Formulas II and IV.

Reactions between functional group containing active hydrogen atoms and the isocyanate moiety are well-known (see Sec. III of "Polyurethanes: Chemistry and Technology," part I, by Saunders and Frisch, Interscience Publishers, 1962). Suitable fluoroaliphatic radical-active hydrogen-containing precursors which can be used to prepare the above-described oligomers are known in the art (e.g., see U.S. Pat. Nos. 3,088,849, 3,094,547, 3,128,272, 3,255,131, 3,458,571, 2,915,554, 3,472,894, 3,471,518, 3,470,258, 3,446,570, 3,304,278, and 3,478,116).

Alternatively, oligomeric polyurethanes used in this invention can be prepared by reaction of a fluoroaliphatic radical-containing isocyanate with a poly(oxyalkylene) prepolymer containing active hydrogen atoms. Suitable isocyanates for this purpose are known in the art (e.g., see U.S. Pat. No. 2,706,733).

The above exemplifies the preparation of oligomers used in this invention by polymerization of fluoroaliphatic radical-containing monomers and poly(oxyalkylene)-containing comonomers. Alternatively, this type of oligomer can be prepared by reacting a reactive prepolymer containing either fluoroaliphatic radicals, $R_f$, or poly(oxyalkylene) radicals, $(OR')_x$, and additionally containing functional groups with respectively poly(oxyalkylene)- or fluoroaliphatic radical containing derivatives. For example, a hydroxy-containing prepolymer can be prepared by copolymerizing a fluoroaliphatic radical containing acrylate, such as described above, with a minor amount of hydroxypropyl acrylate, and reacting the hydroxy group of the prepolymer with an excess of toluene diisocyanate to produce an isocyanate prepolymer. The latter is then reacted with a monomethylated poly(oxyalkylene) glycol to produce an oligomer of this invention falling within the scope of said Formulas I and III.

The various resinous materials and various filler reinforcements and other particulate materials dispersed in the resinous matrix to be used in making the improved composites of this invention, as well as methods of processing these materials in making the composites, and their applications, are those known to the art. In this connection, reference is made to "Modern Composite Materials," edited by Brautman and Krock, published by Addison-Wesley Publishing Company, Reading, Mass. (1967); "Handbook of Fiberglass and Advanced Plastics Composites," edited by G. Lubin, published by Van Nostrand Reinhold Company (1969); and "Filament Winding," by D. V. Rosato and C. S. Grove, Jr., published by Interscience Publishers (1964).

Illustrative resins which can be used to provide the resin matrix for the composites of this invention include polyester resins (generally of the unsaturated alkyd-styrene type, formulated with various organic peroxide curing agents and accelerators, commonly metallo-organic components such as cobalt naphthenate), epoxy resins (such as those based on epichlorohydrin and bisphenol A, epoxy novolac resins, and cycloaliphatic epoxy resins), phenolics, silicones, high temperature resistant polymers, such as polybenzothiazoles, and polyarylene benzimidazoles, and thermoplastic resins, such as polystyrene, polyethylene, polypropylene, polycarbonate, acetal, ABS, SAN, chlorinated polyethers, polyphenylene oxides, polyvinyl chloride, acrylic, polysulfone, urethane and fluorocarbon resins.

Illustrative particulate material which can be dispersed in the resin matrix as a filler or reinforcement, include glass, asbestos, nylon, boron, carbon or graphite, carbon black, cotton, cellulose, talc, calcium carbonate, silica flour, diatomaceous earth, metallic oxides such as zinc oxide, magnesium oxide, thoria, aluminum borate, aluminum borosilicate, zirconia, zircon, zirconia-calcia, alumina, magnesium aluminate, and aluminum silicate, metallic powders such as aluminum, bronze or steel. The particular shape or configuration, and size, of the particulate material can vary, e.g. fibers, flakes, spheres and other particulates. In the case of glass, this material, particularly useful as a reinforcement, can be in the form of rovings, chopped strands, reinforcing mats, surfacing and overlay mats, yarns, woven fabrics, woven roving, nonwoven fabrics (unidirectional or multidirectional rovings in sheet form). Glass fibers are particularly useful in forming reinforced plastic composites. One particular type commonly used in a high-strength applications is known as "E-Glass," consisting of approximately 54.5% by weight $SiO_2$, 14.5% $Al_2O_3$, 22% CaO, 8.5% $B_2O_3$, and 0.5% $Na_2O$. Fiber diameters can vary in commercially available materials from 1.2 to $7.5 \times 10^{-4}$ inches. Such fibers generally show a tensile strength in the region of 250,000 lbs. per square inch, and are capable of producing composites with tensile strength in the region of 100,000 to 200,000 lbs. per square inch.

The relative amounts of resins and particulate material dispersed therein can vary. The resinous matrix generally comprises at least 20% by volume of the composite article and may include as much as 95%. Generally, the resin will comprise 40% to 60% by volume of the composite. The characteristics of the composite depend primarily upon the volume ratios of matrix and particulate; weight ratios will depend upon the density of the particulate material. The amount of fluoroaliphatic radical-containing oligomer incorporated in the composite can vary and, functionally stated, the amount to be used will be that sufficient to improve the wetting of the particulate surface by the resin. Only a relatively small amount of oligomer is necessary to completely cover the surface of the particulate. In any case, the amount is less than the solubility limit of the oligomer in the resin. Generally, the amount of oligomer will be 0.005 to 5 weight parcent, preferably 0.02 to 0.5 weight percent, based on the weight of the resin used.

Any of the known methods of processing composites can be used in making the improved self-supporting composite shaped articles of this invention. Such processing methods include lay-up techniques (particularly useful in molding room temperature curing thermosetting polyesters and epoxies with glass minerals and fiber reinforcements dispersed therein), bag molding (useful for example in molding reinforced preimpregnated material containing a thermosetting resin), matched die molding (where a resin, such as polyester, is added to a glass or asbestos mat, chopped glass preformed, or woven, nonwoven, or roving cloth or fabric positioned in a heated mold), and other processing techniques known in the art and described as, for example, in the aforementioned texts.

The following examples illustrate objects and advantages of this invention, but it should be understood that the various materials and amounts thereof described in these examples, and the various processing techniques and conditions, and other details recited in these samples should not be construed to unduly limit this invention. In these examples, "parts" refer to parts by weight, unless otherwise noted.

EXAMPLE 1

To a glass reactor fitted for stirring, vacuum, nitrogen inlet, heating, cooling, and distillation, are added 120 parts toluene solvent, 36 parts N-butyl perfluorooctanesulfonamidoethyl acrylate, $$C_8F_{17}SO_2N(C_4H_9)CH_2CH_2O_2CCH=CH_2$$

and 90 parts of a poly(oxyalkylene) acrylate solution. The contents of the reactor are heated with stirring at 55° C. for ½ hr. and then 6 parts of n-octyl mercaptan, chain transfer agent, and 0.9 part tertiary butylhydroperoxide promoter, t-$C_4H_9$OOH, are added. The reactor is purged of oxygen by evacuation and repressurized with nitrogen. The contents are then stirred at 65° C. for about 16 hrs. The solvent is removed from the reactor under vacuum, final removal being effected for 1 hr. at 95° C. at a pressure of about 200 mm. Hg. The resulting liquid product, comprising a fluoroaliphatic oligomer of said Formula IV, has a viscosity of about 5000 cp. at 25° C. and a density of about 1.2 g./cc.; it is particularly suitable as a wetting agent for glass reinforced polar resin matrices such as epoxies and polyesters.

The poly(oxyalkylene) acrylate solution used in preparing the above-described fluoroaliphatic oligomer is prepared by adding 120 parts toluene, 90 parts $$HO(C_2H_4O)_{10}(C_3H_6O)_{22}(C_2H_4O)_{10}H$$

(Pluronic 44), 0.05 parts phenothiazine, 4.45 parts acrylic acid, and 1 part p-toluene sulfonic acid to a glass reactor fitted for stirring, heating, cooling, and reflux. The contents of the reactor are heated to reflux 110–120° C., with stirring, until the acid content is constant. The contents of the reactor are cooled to 50° C. and neutralized with 2 parts powdered calcium hydroxide and the contents then stirred further for about ½ hr. Color of the resulting poly(oxyalkylene) acrylate solution can be improved, if desired, by adding about 5 parts diatomaceous earth and filtering.

EXAMPLE 2

A fluoroaliphatic oligomer, falling within the scope of said Formula IV, is prepared using equipment like that described in Example 1 by charging to the reactor 30 parts N-ethyl perfluorooctanesulfonamidoethyl methacrylate, $$C_8F_{17}SO_2N(C_2H_5)C_2H_4O_2CC(CH_3)=CH_2$$

85 parts ethyl acetate, 70 parts of a poly(oxyalkylene) acrylate, $CH_3O(C_2H_4O)_{16}COCH=CH_2$, and 1.5 parts n-octyl mercaptan. The reactor contents are heated to 55° C. and the reactor purged with nitrogen. One part azobisisobutyronitrile (dissolved in 15 parts ethyl acetate) is then added, the reactor purged once with nitrogen, the contents heated with agitation to 75° C., and polymerization continued for about 10 hrs., cooling or heating as necessary to maintain this temperature.

The resulting fluoroaliphatic oligomer product is conveniently used as a 50% solution in ethyl acetate, although the solvent can be removed under vacuum at temperatures below 100° C. to produce a waxy solid product. These products can be used as wetting agents for reinforced resins based on the less-oxygenated resin systems such as nylon, vinyl phenolic, and acrylic resins, though they are suitable for use in reinforced epoxy and polyester resins.

The poly(oxylalkylene) acrylate used in preparing the above-described fluoroaliphatic oligomer is prepared in a suitable glass flask fitted with condenser and mechanical agitator by charging it with 100 parts of a polyoxyethyleneglycol monomethyl ether of molecular weight about 700 ("Carbowax" 750), 1 parts of acrylic acid, 80 parts of toluene and 0.05 part of phenothiazine as polymerization inhibitor. Agitation and heating are started, 1.5 parts of sulfuric acid is added to the refluxing solution and water is removed. The hot solution is decolorized with carbon, cooled, made alkaline with Ca(OH)$_2$, and filtered. An additional 0.01 part of phenothiazine is added and toluene is then removed under reduced pressure to leave the acrylate as a viscous residue. Saponification equivalent is 745. Infrared spectroscopy indicates the presence of acrylate ester groups and absence of hydroxyl groups.

EXAMPLE 3

A fluoroaliphatic oligomer falling within the scope of said Formula I is prepared in equipment similar to that described in Example 1 by charging to a reactor 20 parts of N-ethyl perfluorooctanesulfonamidoethyl methacrylate, 20 parts $C_{18}H_{37}O_2CC(CH_3)=CH_2$ and 117 parts heptane. The contents of the reactor are heated to 55° C., and the reactor purged with nitrogen, 0.3 part benzoylperoxide (dissolved in 3 parts heptane) is added and the contents of the reactor heated to 65° C. and maintained at that temperature with stirring for 4 hrs. The resulting fluoroaliphatic oligomer is conveniently used as a solution in heptane, although the solvent can be stripped under vacuum at temperatures below 100° C. to produce the product in a solid form for use. These products are particularly useful as wetting agents in relatively non-polar resin systems, such as polyolefin or polystyrene.

EXAMPLE 4

Using the equipment described in Example 1, a reactor is charged with 20 parts N-butyl perfluorooctanesulfonamidoethyl acrylate, 16 parts $C_{18}H_{37}O_2CC(CH_3)=CH_2$, 4 parts of the poly(oxyalkylene) acrylate solution described in Example 1, and 160 parts tetrahydrofuran. The contents of the reactor are heated to 55° C. and the reactor purged with nitrogen. Three-tenths part azobisisobutyronitrile (dissolved in 3 parts tetrahydrofuran) is added and polymerization continued at 65° C. for about 10 hrs. or until free monomer content is less than 5% of that charged.

The resulting fluoroaliphatic oligomer, which falls within the scope of Formula IV, is conveniently used in the form of a tetrahydrofuran solution, but the solvent can be partially removed at about 70° C. and 50 mm. Hg to provide a 50% solution or the solvent can be completely removed to provide the product in the form of sticky paste. These products are particularly effective as wetting agents for reinforced polyester resins, particularly in those reinforced resin systems in which agitation during use tends to produce undesirable foaming by some of the other wetting agents.

EXAMPLE 5

Using the equipment described in Example 1, a reactor is charged with 35 parts N-butyl perfluorooctanesulfonamidoethyl acrylate, 1.12 parts HSC$_2$H$_4$OH, 0.25 part azobisisobutyronitrile and 72 parts ethyl acetate, and polymerization is effected at 65° C. in 16 hours. To 16.5 parts of the resulting hydroxy-terminated fluoroaliphatic oligomer solution, 0.47 part 2,4-tolylene diisocyanate and 4.5 parts dry ethyl acetate are added. The solution is refluxed for 5 hrs. to produce an isocyanate-terminated fluoroaliphatic oligomer as a 27% solution in ethyl acetate. To 34 parts of the latter solution is added 4.65 parts Pluronic 44 and 0.14 part diacetoxydibutyl tin catalyst and the solution heated with stirring at 65° C. for about 5 hrs. to produce a low molecular weight fluoroaliphatic block copolymer with urethane linkages falling within the scope of said Formula I. This product is particularly suitable as a low-foaming wetting agent in reinforced epoxy, urethane, polyester, vinyl and acrylic resin systems. The product can be recovered as a viscous clear yellow liquid having a fluorine content above 30% by weight by removal of the solvent at 50 mm. Hg and about 100° C.

EXAMPLE 6

A fluoroaliphatic oligomer is prepared in a manner similar to that described in Example 5 by reacting 4.1 parts of the hydroxy-terminated fluoroaliphatic oligomer (dissolved in 30.6 parts dry ethyl acetate), 6.6 parts Pluronic 44, 0.7 part 2,4-tolylene diisocyanate, and 0.11 part diacetoxydibutyltin. Heating the resulting mixture for 16 hrs. at 65° C. provides a fluoroaliphatic radical-containing oligomer solution from which the solvent can be evaporated to yield an amber viscous liquid wetting agent which is somewhat more readily incorporated in reinforced polar plastics than the wetting agent of Example 5.

EXAMPLE 7

Polyethylene glycol of average molecular weight about 3000 is converted to the dimethacrylate by azeotropically removing water over 8 to 10 hrs. from a refluxing agitated reaction mixture (under nitrogen) of 54 parts of the glycol, 31.5 parts of toluene, 3.2 parts of methacrylic acid, 0.016 part of phenothiazine and 0.57 part of sulphuric acid. The toluene is then removed by distillation and the residue dissolved in trichloroethylene. After neutralization with 2.3 parts of calcium hydroxide and filtration with 7.3 parts filter-aid, the filtrate is concentrated to residue at 10 mm. Hg pressure and 60° C., cast into a tray and allowed to solidify. The saponification equivalent is 1700 corresponding to an average molecular weight of about 3400, calculated as dimethacrylate.

A 60/40 copolymer is prepared in solution in 61 parts of ethyl acetate from 12 parts of N-methyl perfluorooctanesulfonamidoethyl acrylate, 8.2 parts of the above dimethacrylate and 0.42 part of n-octylmercaptan, using 0.153 part of azobisisobutyronitrile as initiator. Heating and agitation are maintained at 70° C. for 16 hrs. and the solution is then filtered through a 25 micron filter. There is about 90% conversion to fluoroaliphatic oligomer. A 5% solids solution in ethylacetate of this product is particularly effective as a wetting agent for reinforced nylon-type plastics.

EXAMPLE 8

Twenty-five parts $C_8F_{17}SO_2NH_2$, 150 parts water, 1.4 parts sodium hydroxide, 16.6 parts ethylene chlorohydrin, and 15 parts dioxane are added to a reactor fitted for agitation, heating, cooling, and draining. The mixture is stirred and heated to obtain a clear solution. When the mixture reaches 80° C., a solution of 5.4 parts of sodium hydroxide in 30 parts of water is slowly added. Stirring is continued for about 2 hrs. at about 80° C. and the mixture is allowed to cool to room temperature. The aqueous mixture is extracted with 150 parts ethyl acetate. The ethyl acetate extract is washed successively with 50 parts of a 5 wt. percent aqueous sodium hydroxide solution, water and 5 wt. percent aqueous sodium chloride solution. Evaporation of the solvent leaves a residual product of $C_8F_{17}SO_2N(CH_2CH_2OH)_2$ in about 85% yield.

To a reactor are added 11.5 parts of the

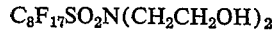
$C_8F_{17}SO_2N(CH_2CH_2OH)_2$ product described above and 25.6 parts methyl ethyl ketone, and the mixture heated to strip 6.4 parts of the ketone solvent to insure removal of water. The reactor contents are then cooled to 50° C. and 6.68 parts 2,4-tolylene diisocyanate are added. The reactor is heated with stirring to 60° C. and reaction continued for about 4 hrs., the reactor being purged with a slow stream of dry nitrogen. The reactor contents are cooled to 50° C. and 53.8 parts Pluronic 44, and 0.02 part triethylamine are added. The temperature of the reactor contents is increased to 75° C. and reaction continued until no free isocyanate is detectable, about 4 hrs. The resulting fluoroaliphatic oligomer can be used in solution or the solvent removed under vacuum at temperatures below 100° C. and the amber viscous liquid product recovered. This product is particularly useful as a wetting agent for reinforced polar resins, such as epoxies, polyester and urethanes.

EXAMPLE 9

A resin matrix solution is prepared by mixing 2700 parts epoxy novolak (DEN-438, epoxy equivalent 180), 1350 parts diglycidyl ether of bis(4-hydroxyphenyl) dimethylmethane, and 1800 parts acetone. To 100 parts of the resulting resin matrix solution are added 0.22 part $BF_3 \cdot C_2H_5NH_2$ and 0.18 part of the fluoroaliphatic oligomer prepared as described in Example 1.

Glass cloth (Type 181, Mil. Spec. C-9084B) is passed through a bath of the resulting fluoroaliphatic-radical-containing oligomer-resin matrix solution to coat the glass cloth to about a thickness of 0.25 mm. The coated glass cloth is then passed over a metal roll heated to 190° C. to remove solvents. The dried impregnated cloth is cut into sheets (240 cm.²). Twelve such sheets are superimposed between mold-release treated platens and heated under pressure of 3.5 kg./cm.² and 175° C. for 30 min. Density and resin contents of the resulting reinforced laminate are then determined, these results being set forth below. For purposes of comparison, the same measurements are made on a similar laminate made by passing glass cloth through a bath of resin matrix solution which is the same as described above except that it does not contain any fluoroaliphatic oligomer.

|  | Laminate made with fluoroaliphatic oligomer | Laminate made without fluoroaliphatic oligomer |
|---|---|---|
| Resin content, weight percent | 27.14 | 26.63 |
| Density, g./cc: |  |  |
| Found | 1.96 | 1.90 |
| Theory | 1.98 | 1.99 |

The above data indicate that the laminate prepared from a resin matrix without the fluoroaliphatic radical-containing oligomer of this invention contains about 4.5 times as much void space as the laminate containing such wetting agent.

Initial physical properties and those after immersion for 2 hrs. and for 24 hrs. in boiling tap water of these two types of laminates are as follows:

|  | Laminate made with fluoroaliphatic oligomer, kg./cm.² | Laminate made without fluoroaliphatic oligomer, kg./cm.² |
|---|---|---|
| Flexural strength: |  |  |
| Initial | 5,950 | 6,000 |
| 2 hours boil | 2,980 | 2,280 |
| Flexural modulus: |  |  |
| Initial | 2,720 | 2,790 |
| 2 hours boil | 2,280 | 2,090 |
| Beam shear: |  |  |
| Initial | 397 | 351 |
| 2 hours boil | 190 | 118 |
| 24 hours boil | 99 | 77 |

Boiling in water is a greatly accelerated test for estimating degradation of properties on exposure during use to atmospheric humidity or corrosive environments. Beam shear measurements correlate particularly well with the strength of the bond between the reinforcement and resin matrix. The above data clearly show the superior retention of properties of the laminate made with the fluoroaliphatic oligomer in accordance with this invention.

Similar results are obtained, although absolute values of the physical properties are lower, when a polyester resin such as the styrenated alkyd resins (e.g. Paraflex 444) is substituted for the epoxy resin illustrated above.

EXAMPLE 10

A resin matrix solution is prepared by mixing 64.7 parts epoxy novolak (DEN–438, epoxy equivalent 180), 32.4 parts diglycidyl ether of bis(4-hydroxyphenyl) dimethyl methane, 2.9 parts $BF_3 \cdot C_2H_5NH_2$ and 0.25 part of the fluoroaliphatic oligomer prepared as described in Example 1. Glass roving (silane-treated, E glass, Type 7201, 20 ends/inch) is impregnated with the resulting solution and filament wound on a 12-inch O.D. drum to form a sheet of impregnated fibers with parallel orientation. Test bars are prepared from 9 plies of this sheet, place in a 325° F. press under pressure of 3.51 kg./cm.², held at these conditions for ½ hr. and then removed and placed in an oven for 4 hrs. at 175° C. Properties of the laminates are set forth below. For purposes of comparison, glass roving are similarly treated with a similar resin matrix solution which does not contain the fluoroaliphatic-radical oligomer and the physical properties of the resulting laminates are also set forth below.

| | Laminate prepared with fluoroaliphatic oligomer | Laminate prepared without fluoroaliphatic oligomer |
|---|---|---|
| Resin content, percent | 23.3 | 26.1 |
| Specific gravity | 2.06 | 2.02 |
| Tensile strength, initial, kg./cm.² | 430×10³ | 440×10³ |
| Tensile modulus, initial, kg./cm.² | 19.0 | 18.0 |
| Flexural strength, kg./cm.²: | | |
| Initial | 655 | 635 |
| 2 hours boil | 603 | 597 |
| 24 hours boil | 527 | 421 |
| Flexural modulus, kg./cm.²: | | |
| Initial | 22 | 21 |
| 2 hours boil | 22 | 20 |
| 24 hours boil | 22 | 20 |
| Beam shear, kg./cm.²: | | |
| Initial | 25.1 | 25.4 |
| 2 hours boil | 25.1 | 25.4 |
| 24 hours boil | 20.9 | 19.8 |

The above data show that laminate made with fluoroaliphatic oligomer has better retention of properties after a 24-hour water boil.

EXAMPLE 11

Glass fabric of Example 9 is saturated with a nitrile rubber-modified epoxy resin (85% in methyl ethyl ketone) containing 0.5% by weight of the fluoroaliphatic oligomer prepared as described in Example 1. The impregnated fabric contains about 35% by weight of resin solids. Solvent is removed by passage over a drum heated to 70° C. An aluminum honeycomb is placed between two single-ply panels of the dried impregnated fabric and the assembly is heated in a platen press to 130° C. for 30 min. at 510 kg./cm.², and is then postcured in an oven at 135° C. for 30 min. For comparison purposes, a similar assembly is made using a resin matrix that does not contain any fluoroaliphatic oligomer. The laminate containing the fluoroaliphatic oligomer has large uniform fillets, free of voids, at the honeycomb junctures, as compared to the laminate made without the oligomer. When the two laminates are stressed in tension to failure, the break in the case of the oligomer-containing laminate occurs within the panel, much glass remaining adhered to the aluminum. In the surfactant-free case, the break occurred predominantly at the aluminum-resin interface, indicating significantly poorer bond to the aluminum.

Various modifications and alterations of this invention will become apparent to those skilled in the art without departing from the scope and spirit of this invention.

What is claimed is:

1. In the preparation of a self-supporting structural, filled or reinforced resinous composite shaped article, the improvement comprising incorporating therein fluoroaliphatic radical-containing oligomer soluble in the resinous matrix of the composite, said oligomer containing 5 to 30 weight percent fluorine and being present in an amount of 0.005 to 5 weight percent based on the weight of said resinous matrix.

2. The method according to claim 1 wherein said oligomer contains a plurality of pendant fluoroaliphatic groups linked to moieties which solubilize said fluoroaliphatic groups in the resinous matrix.

3. The method according to claim 2, wherein said solubilizing moieties comprise poly(oxyalkylene) moieties.

4. The method according to claim 1 wherein said oligomer has the general formula:

$$(R_f)_m Q[RQ'A]_n \qquad (I)$$

or $$[(R_f)_m Q[RQ'A']_n]_z \qquad (II)$$

where $R_f$ is a fluoroaliphatic radical,
R is a solubilizing divalent organic radical free of functional groups containing active hydrogen atoms,
Q is a linkage through which $R_f$ and R radicals are covalently bonded together,
A is a monovalent terminal organic radical,
A' is A or a valence bond, with the proviso that at least one A' is a valence bond interconnecting a Q-bonded R radical to another Q,
Q' is a linkage through which A, or A', and R are covalently bonded together, and
m, n and z are integers of at least 2.

5. The method according to claim 4 wherein R is poly(oxyalkylene).

6. The method according to claim 5 wherein $R_f$ has 3 to 20 carbon atoms and contains 40 to 70 weight percent fluorine, the terminal portion of $R_f$ having at least 3 fully fluorinated carbon atoms.

7. The method according to claim 5 wherein $R_f$ is perfluoroalkyl having 6 to 12 carbon atoms and containing 50 to 77 weight percent fluorine, the terminal portion of $R_f$ being $CF_3CF_2CF_2-$.

8. The method according to claim 5, wherein said poly(oxyalkylene) has the formula $(OR')_x$ where R' is alkylene with 2 to 4 carbon atoms and x is an integer of at least 5.

9. The method according to claim 5 wherein said poly(oxyalkylene) comprises poly(oxyethylene).

10. The method according to claim 5 wherein said oligomer contains 10 to 25 weight percent fluorine.

11. The method according to claim 1 wherein said filler or reinforcement comprises glass fibers.

12. The method according to claim 1 wherein said resin is selected from the group consisting of polyester resins and epoxy resins.

13. A composite according to claim 18 wherein R is poly(oxyalkylene).

14. The composite according to claim 18 wherein R comprises poly(oxyethylene).

15. A preimpregnated composite comprising reinforcing fibers, curable epoxy resin matrix, and a fluoroaliphatic radical-containing oligomer soluble in said epoxy resin, said oligomer containing 5 to 30 weight percent fluorine and being present in an amount of 0.005 to 5 weight percent based on the weight of said resin matrix.

16. The preimpregnated composite of claim 15 wherein said fibers are glass fibers and said oligomer contains a plurality of pendant fluoroaliphatic radicals linked to poly(oxyethylene) moieties.

17. A shaped, self-supporting, structural composite article comprising a filler or reinforcement, a resin matrix, and fluoroaliphatic radical-containing oligomer soluble in said resin matrix and being present therein in the amount of 0.005 to 5 weight percent, said oligomer containing 5 to 30 weight percent fluorine.

18. The composite according to claim 17 wherein said filler or reinforcement comprises glass fiber, said resin matrix is polyester resin or epoxy resin, and said oligomer is of the general formula $$(R_f)_m Q[RQ'A]_n \quad (I)$$

or $$[(R_f)_m Q[RQ'A']_n]_z \quad (II)$$

where $R_f$ is a fluoroaliphatic radical,

R is a solubilizing divalent organic radical free of functional groups containing active hydrogen atoms, Q is a linkage through which $R_f$ and R radicals are covalently bonded together, A is a monovalent terminal organic radical, A' is A or a valence bond, with the proviso that at least one A' is a valence bond interconnecting a Q-bonded R radical to another Q, Q' is a linkage through which A, A', and R are covalently bonded together, and m, n, and z are integers of at least 2.

References Cited
UNITED STATES PATENTS 3,541,039  11/1970  Whiton _____ 260—4 OR X
3,655,610  4/1972  Vasta _____ 260—37 EP X LEWIS T. JACOBS, Primary Examiner U.S. Cl. X.R.

260—37 N, 37 EP, 41 A

UNITED STATES PATENT OFFICE
CERTIFICATE OF CORRECTION

Patent No. 3,787,351  Dated January 22, 1974

Inventor(s) Olson, Maynard H.

It is certified that error appears in the above-identified patent and that said Letters Patent are hereby corrected as shown below:

Column 2, line 24, delete the comma after "before";

Column 2, line 31, "having" should read -- have --;

Column 4, line 28, "$(OR_2)_x$" should read -- $(OR')_x$ --;

Column 4, line 34, "$CH_2`CH-$" should read -- $-CH_2\overset{|}{C}H-$ --;

Column 5, line 57, in the first formula, the portion "$\underset{\underset{CH_3}{|}}{(\overset{|}{O}R')_x}$"

should read -- $\underset{\underset{CH_3}{|}}{(\overset{|}{O}R')_x}$ --;

Column 6, line 20, in the first formula, the portion "$\begin{array}{c}\overset{|}{C}=O\\(\overset{|}{O}R')_x\\\overset{|}{C}=O\end{array}$"

should read -- $\begin{array}{c}\overset{|}{C}=O\\(\overset{|}{O}R')_x\\\overset{|}{C}=O\end{array}$ --

Column 6, line 64, "diethylphosphite" should be followed by a comma;

Column 7, line 65, "radical containing" should read -- radical-containing --;

Column 8, line 44, "a" should be deleted;

Column 9, line 29, the comma after "mercaptan" should be deleted;

UNITED STATES PATENT OFFICE
CERTIFICATE OF CORRECTION

Patent No. 3,787,351                     Dated January 22, 1974

Inventor(s)  Olson, Maynard H.

It is certified that error appears in the above-identified patent and that said Letters Patent are hereby corrected as shown below:

Column 10, line 13, "1 parts" should read -- 12 parts --;

Column 11, line 20, "diacetoxydibutyltin" should read
          -- diacetoxydibutyl tin --;

Column 13, line 37, "635" should read -- 625 --;

Column 13, line 43, "25.4" should read -- 25.1 --.

Signed and sealed this 9th day of July 1974.

(SEAL)
Attest:

McCOY M. GIBSON, JR.                    C. MARSHALL DANN
Attesting Officer                       Commissioner of Patents